Dec. 2, 1930.  C. W. VOGT  1,783,867
MACHINE FOR PROCESSING MATERIALS
Filed June 11, 1928  4 Sheets-Sheet 1

Dec. 2, 1930.  C. W. VOGT  1,783,867
MACHINE FOR PROCESSING MATERIALS
Filed June 11, 1928   4 Sheets-Sheet 2

INVENTOR.
CLARENCE W. VOGT.
BY
ATTORNEYS.

Dec. 2, 1930.  C. W. VOGT  1,783,867
MACHINE FOR PROCESSING MATERIALS
Filed June 11, 1928   4 Sheets-Sheet 4

INVENTOR.
CLARENCE W. VOGT.
BY
ATTORNEYS.

Patented Dec. 2, 1930

1,783,867

UNITED STATES PATENT OFFICE

CLARENCE W. VOGT, OF LOUISVILLE, KENTUCKY, ASSIGNOR TO VOGT INSTANT FREEZERS, INC., A CORPORATION OF DELAWARE

MACHINE FOR PROCESSING MATERIALS

Application filed June 11, 1928. Serial No. 284,458.

This invention relates to a processing machine, which is particularly adaptable for use as a continuous freezer for manufacturing ice cream, sherbet and the like, and also for the processing of vegetable and animal oils, and all other materials wherein it may be desirable to vary or control temperature of the same while being agitated or whipped. This machine is of the character shown and described in my co-pending application, Serial No. 262,339, filed March 17, 1928, to which reference may be had.

In said application as well as in the present application, there is shown a power operated machine through which a material or mix may be continuously passed from one end to the other so that the temperature will be controlled or varied, while being whipped or agitated. In respect to the manufacture of ice cream, this machine may be conveniently used by injecting the mix under pressure at one end with the proper quantity of fluid such as air, carbon dioxide, or the like to obtain the desired over-run, and forcing it under pressure while being processed through the processing chamber. Wherein it is desired to employ the machine with respect to the manufacture of substitutes for lard, oleomargarine and the like, it has the advantage of processing such material under pressure greater than the atmosphere so that by closing or partially closing the fluid intake, the material may be processed without incorporating a fluid therein, or when desirable, a limited amount of fluid.

In such material wherein the temperature is varied by cooling, it is highly advantageous by means of this machine to process the same under pressure greater than the atmospheric, whereby the crystallization takes place quickly in a uniform state caused by the beating or whipping of the material as it is cooled, and thus obtaining a smoother quality of product, eliminating therefrom hard or gritty particles heretofore created by the non-uniformity of the crystallization during the cooling process. The machine is also applicable to the processing of eggs, wherein it is desired to freeze the yokes and whites of the eggs after they are broken. By means of this machine, the eggs are frozen as they are stirred or mixed under greater than atmospheric pressure so that no air will be beaten into the product causing deterioration. Other materials of this character may likewise be processed with the same or similar advantages.

The capacity may be doubled or trebled without increase in floor space, by adding additional units mounted one upon the other. This is advantageous to the manufacturer in that it enables a single unit machine to be installed, and if it is then found necessary to increase the capacity, one or more additional units may be mounted in superimposed position.

One feature of the present invention resides in the construction of the machine whereby it is self-contained, in that the unit for supplying the temperature changing medium is mounted directly in connection therewith, preferably in the base of the machine, so as to be housed and concealed thereby. This enables a machine of this character to be employed in exposed positions in retail stores, display windows and the like without the necessity of running supply pipes thereto for the temperature changing medium.

A further feature of the invention resides in the torque controlled plasticity valve which is directly connected with the material pump for controlling a by-pass therein. By means of this arrangement, the material being processed is maintained at the desired and predetermined plasticity by reason of the torque set up by its resistance, which is due to the degree of plasticity, actuating a valve controlling a by-pass associated with the fluid pump so as to cause a greater or lesser quantity of material to be pumped into the processing chamber.

In the case of products where the maintenance of temperatures is of importance, tiering of these units simplifies the conveying equipment as well as the labor required to operate and control the conveyors. This is especially important on ice cream.

In my prior application above referred to the valve for admitting the temperature changing medium is controlled by the varying torque of the agitating member. One feature of the invention resides in the automatic control of the unit for supplying the temperature changing medium by means of a torque controlled switch in the electric power circuit of said unit. By the phrase "unit for supplying the temperature changing medium" or equivalent phrase, I mean not merely a control valve as in my prior application, but the power unit for delivering the medium, such as a pump or compressor. By means of this invention, the power unit for supplying temperature control medium will be automatically stopped upon the material being processed acquiring a maximum or minimum degree of plasticity. Thus, if the stiffness of the material reaches a degree of plasticity beyond which it may be controlled by the injection of fresh material, or, in event the processing mechanism becomes inoperative for any reason such as to offer too great a resistance to the driving motor, the unit supplying the temperature control medium will be automatically stopped by the breaking of the power circuit to the pump or compressor. If, on the other hand, there is a minimum of resistance to the power motor by reason of the emptying of the processing chamber of material therein, the unit supplying the temperature control medium will likewise be stopped.

A further feature in the invention resides in the simultaneous and automatic control of the fluid and liquid being processed, as this provides a novel and desirable means for the maintenance of a constant ratio of the fluid and liquid.

Another feature of the invention resides in the control of the processed material when discharged from the apparatus for holding back the material in the whipping chamber for maintaining the desired pressure at the discharge end.

The full nature of the invention will be understood from the accompanying drawings and the following description and claims:

In the drawings there is shown a processing machine having a base housing 10, upon which the mounted processing chamber 11 is removably secured at opposite ends by the end mountings 12. At one end of said chamber there is removably secured upon the supporting rods 13, a driving motor 14. The processing chamber 11 contains a plurality of tubular passageways 15 in which the shafts 16 are caused to rotate by means of the motor 14, said shafts having agitating or whipping blades 17 thereon.

The tubular passageways are surrounded by the refrigerating chambers or passages 18, all as more specifically set forth and described in the above mentioned co-pending application.

Figure 2:
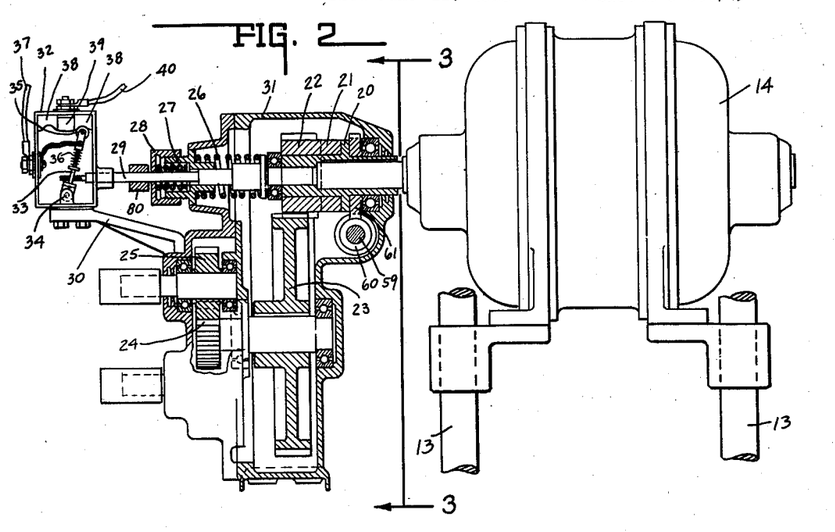
Fig. 2 is an enlarged section through the torque controlled switch and driving mechanism.
Figure 3:
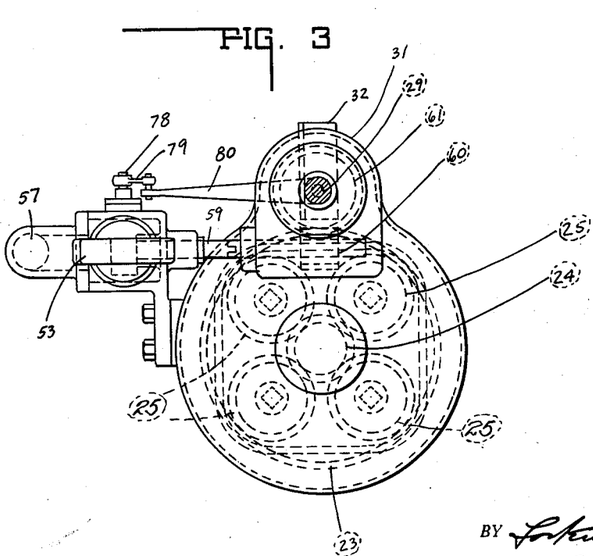
Fig. 3 is a section taken on the line 3—3 of Fig. 2, showing an end view of the processing chamber.

The motor 14 is connected through its driving shaft with the torque control cam member 20 which nests in a corresponding cam member 21 formed with the driving pinion 22. Said pinion is adapted to mesh with and slide longitudinally of the gear 23, having connected therewith the pinion 24 which meshes with and drives the gears 25, having shafts thereon which drive the respective shafts 16 extending through the processing chamber. The cam members 20 and 21 are normally held in nesting position by the tension of the springs 26 and 27, the latter spring being adjustable by the adjusting cap 28. This action is more specifically set forth in my co-pending application, Serial No. 242,667, filed December 27, 1927, (Figs. 5 and 6), wherein the resistance, due to the plasticity of the material being processed, upon the shafts 16, causes the pinion 22 to be thrust forwardly against the tension of the springs 26 and 27, overcoming the same sufficiently to move the torque rod 29 forwardly.

Upon the plasticity decreasing and thereby decreasing the resistance or torque, said springs cause the rod 29 to move in the opposite direction, whereby the members 20 and 21 will more completely nest with each other.

Supported upon the bracket 30, mounted upon the gear housing 31, there is a torque actuated switch 32 for controlling the refrigerating medium. Said switch comprises a pivotally mounted arm 33, having one end pivotally secured at 34 and the free end thereof provided with a contact roller 35 yieldingly mounted on the arm 33 by the spring 36. Said arm is electrically connected with the cable 37, and is mechanically connected with the rod 29. Mounted in the top of the switch there are fibre insulating blocks 38 having a contact block 39 intermediate thereof which is electrically connected with the cable 40. It will be noted from this arrangement that upon the machine being started and operating with the material being processed therein, which material is being maintained at the proper degree of plasticity by the mechanism hereinafter described, the roller 35 of the arm 33 will be maintained by the rod 29 in contact with the block 39 for closing the circuit through the cables 37 and 40 for causing the stopping of the unit for supplying the refrigerating material to the refrigerating chambers 18. Upon the plasticity becoming too great, or the machine not functioning properly, the resistance will create such torque as to cause the rod 29 to be forced forwardly so that the roller 35 engages one of the insulating blocks 38, thus breaking the circuit.

On the other hand, if there is no resistance such as to create a torque which would occur if there is no material to be processed in the machine, the springs 26 and 27 will move the rod 29 rearwardly so as to carry the roller 25 to the other insulating block 38, and thus break the circuit. The breaking of the circuit will cause the refrigerating unit to cease to operate so that there will be no refrigerating action in the machine.

Mounted in the base housing 10 there is diagrammatically illustrated the position of the unit for supplying the refrigerating medium, comprising a driving motor 41 to which the cables 37 and 40 are connected to complete the circuit through the source of power indicated at 42. The motor 41 is adapted to drive the compression pump 43, having connected therewith a series of coils 44 whereby refrigerant is forced through the pipe 45 and expansion valve to the refrigerating chambers 18, and returned to the pump through the pipe 46. This control of the refrigerant supply unit is preferably only to establish the outside limits of operation. The securing of uniform plasticity of the product within these limits is by varying the supply of the material to be treated, as hereinafter set forth.

Figure 4:
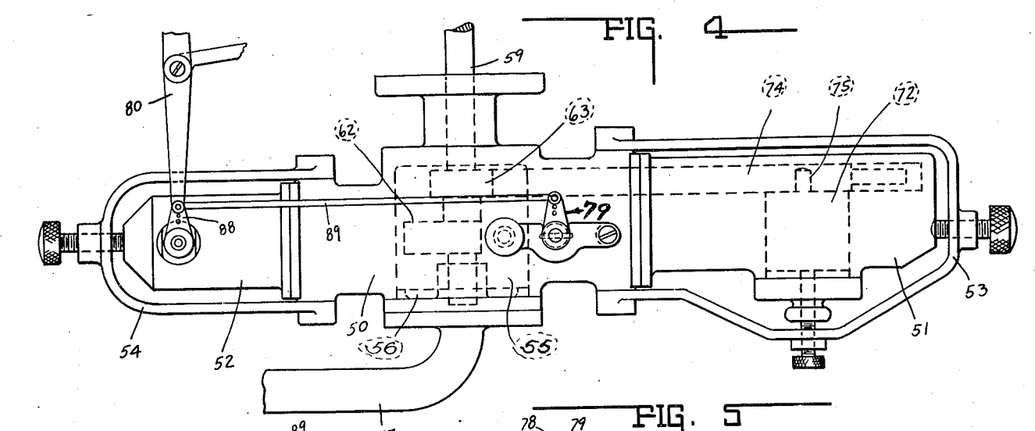
Fig. 4 is a top plan view of the combined fluid and liquid pump.
Figure 5:
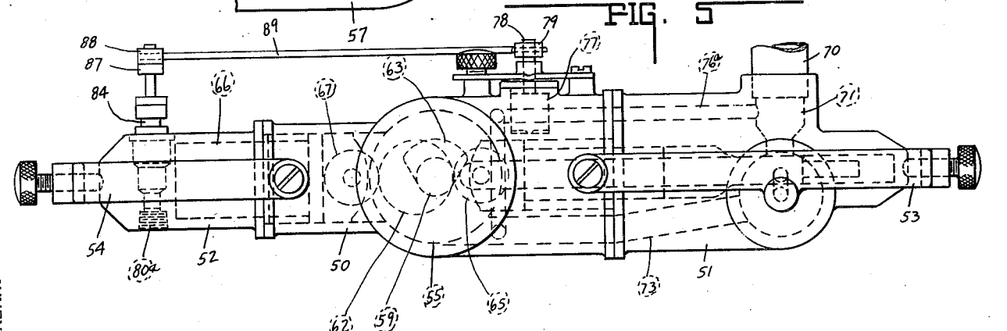
Fig. 5 is a side elevation thereof.
Figure 6:
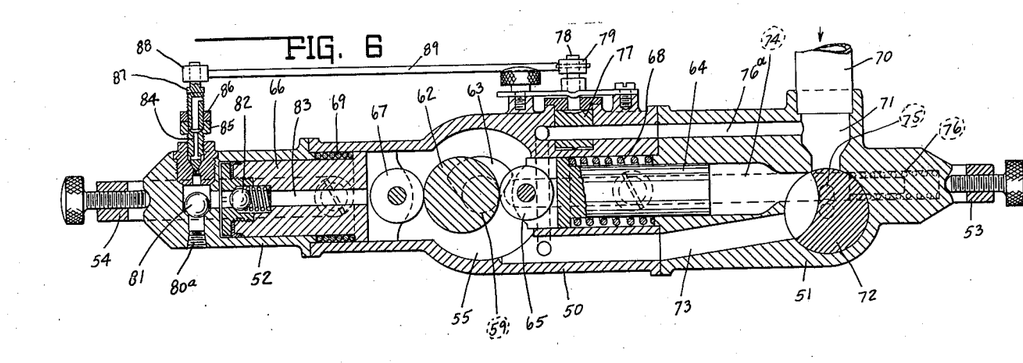
Fig. 6 is a central vertical section thereof.

Mounted at the side of the motor housing 31, there is a combined fluid and liquid pump illustrated in Figs. 4, 5 and 6. Said pump comprises a cylinder 50, having end heads 51 and 52, removably secured at opposite ends thereof by the embracing clamps 53 and 54 respectively.

Substantially at the center of the cylinder 50 there is a mixing and discharge chamber 55 communicating with the discharge outlet 56, connecting with the pipe 57 leading to the forward end of the processing chamber and communicating with one of the processing passageways 15, as indicated at 58. Extending into the chamber 55 and housing 31 there is a shaft 59, having on one end thereof a worm 60 driven by the worm gear 61 from the motor shaft as shown in Fig. 2. Formed on said shaft within said chamber 55 there is a pair of cam members 62 and 63. Cam member 62 is adapted to actuate the material or liquid pumping piston 64 through its engagement with the roller 65 on the inner end of said piston, and also actuate the air or fluid piston 66 through the medium of the roller 67. Said pistons are normally returned from actuated position by the springs 68 and 69 respectively.

The material to be processed is introduced into the pump from any suitable source of supply through the intake pipe 70 which communicates with the passage 71 in the pump head 51. The valve 72 is positioned in said pump head to control the passage of material to the passageway 73 leading to the chamber 55. Said valve is actuated through the medium of the cam member 63 operating upon the valve stem 74, connected with a pin 75, against the tension of the spring 76. A by-pass 76ᵃ connects the discharge end of the passageway 73 with the passage 71, and is controlled by the valve 77 having a stem 78 to which is connected the lever 79. The lever 79 is actuated by the arm 80 which is rigidly connected with the torque rod 29.

In this construction, charges of material to be processed are repeatedly forced by the piston 64 into the processing chamber, and excess material pumped by the piston is returned through the by-pass 76 when the valve 77 is open. Since the valve 77 is controlled by the movement of the torque rod 29 through the lever 80, the resistance of the material will affect the by-passing of the excess material through the by-pass 76. Thus, when there is a subnormal resistance exerted on the driving motor by the material being processed, it will be because there is an abnormally large quantity of material being pumped into the machine and with little or no material by-passing. The low resistance operating on the torque control will move the by-pass valve toward the open position and reduce the amount of material being pumped. Upon the material in the machine becoming stiffer and exerting more resistance to the rotation of the shafts 16 and increased torque, the by-pass valve 77 will be slightly closed, cutting down the by-passing of the material so as to cause more of the material to be forced into the processing chamber. The additional material forced into the chamber and the pressure exerted thereby will increase the heat units to be removed by the refrigerating medium and will raise the temperature of the cooled material to such an extent as to reduce its plasticity and thereby reduce its resistance. By adjusting the tension of the spring 27 by the cap 28, this controlling action will be caused to maintain the material at the desired plasticity by introducing a greater or lesser amount of material to be processed, the cooling effect of the refrigerating medium remaining substantially constant.

Air or other fluid is introduced through the intake 80ᵃ, past the ball check valves 81 and 82, through the passage 83 into the piston 66. Excess air will be forced outwardly through the check valve 84 which may be adjusted to cause the proper amount of air to be forced with the material into the processing chamber to obtain the desired amount of over-run.

Figure 1:
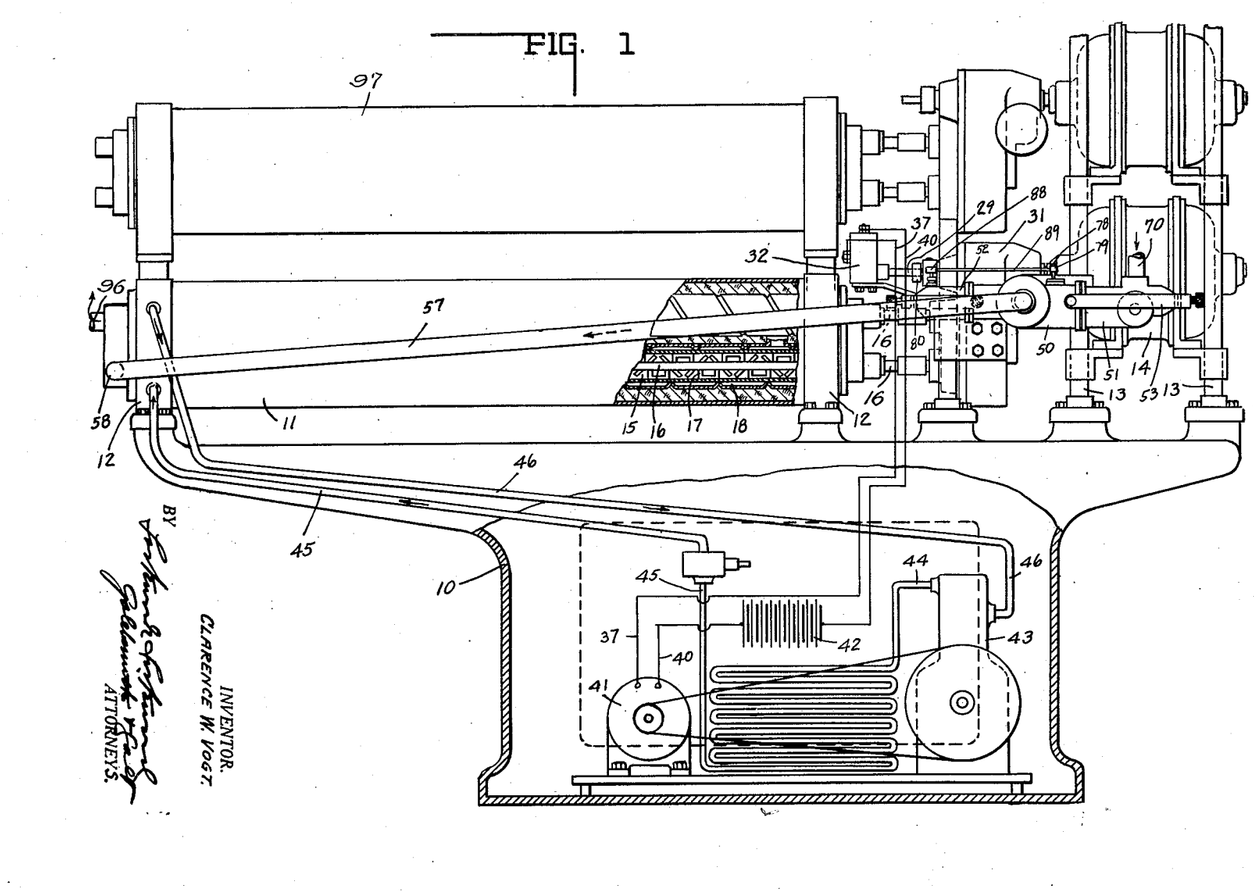
Fig. 1 is a side elevation of the machine with a portion of the base broken away.

It will be noted from the foregoing, that if it is found desirable to employ a two unit machine, an additional unit 97 as indicated in Fig. 1 may be mounted and secured on top of the single unit. A third unit may be likewise mounted thereon for tripling production without increase in floor space.

It will also be noted that the plasticity of the material may be controlled primarily by the amount of material pumped into the chamber, and secondarily by the refrigerating medium control switch—both of which are actuated by the torque set up through the resistance of the material upon the driving motor due to variations in the plasticity or stiffness thereof.

It will further be noted that the material and air or other fluid are simultaneously pumped together under pressure into the chamber in a predetermined ratio so as to cause an absorption of the air by the material as it is forced therein and be discharged through a common conduit. This is accomplished by means of a single pumping unit for both the material and air, which pumping unit is so constructed as to prevent interference with its proper action by the clogging of its operating parts and valves through the injection of foreign matter.

The simultaneous and automatic control of the fluid and liquid being processed, such as ice cream mix and air, is accomplished by connecting the arm 79 with an arm 88 by a connecting rod 89, so that when the arm 80 is actuated by the torque control, it will cause a simultaneous movement of the valves 77 and 84. The movement of the arm 88 actuates the stem 87 which is screwed into the main valve stem 85 which is held in position by the lock nut 86. Any relative adjustment for a fixed ratio may be obtained by loosening the lock nut 86 and moving the connection 87 with relation to the valve stem 85, and then tightening the lock nut. This will obtain a fixed seating and any movement of the connecting rod 89 will cause a corresponding movement of the valve.

Figures 7, 8:
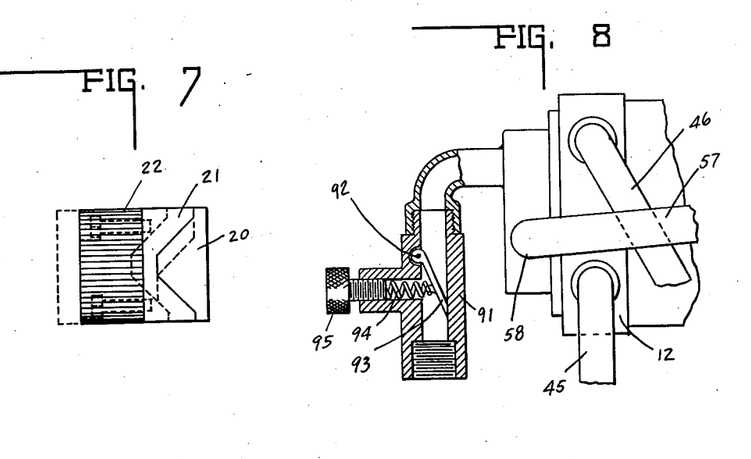
Fig. 7 is a plan view of one of the torque control elements.
Fig. 8 is a central vertical section through the discharge control valve.

As shown in Fig. 8, the discharge outlet 96 for the processed material is provided with a valve housing 91 in which there is pivotally mounted at 92 a valve 93. Said valve is normally held in closed position under tension of the spring 94 which is adjusted by the screw cap 95. By means of this arrangement, the discharge of the processed material is resistant to an extent determined by the tension obtained upon the spring 94.

The invention claimed is:

1. A machine for processing materials, including a processing chamber, means for positively forcing the material to be processed therethrough, a by-pass for relieving said means of excess material, a valve in said by-pass, agitating means in said chamber, and means controlled by the resistance to the agitation of the material in the chamber due to its plasticity for controlling said valve.

2. A machine for processing materials, including a processing chamber, means for positively forcing the material to be processed therethrough, agitating means in said chamber and means controlled by the resistance to the agitation of the material due to its plasticity for controlling the quantity of material forced into said chamber.

3. A machine for processing materials, including a processing chamber, means for introducing the material to be processed to said processing chamber, means in said chamber for agitating the material, and means controlled by the resistance to agitation of the material in said chamber for regulating the amount of material introduced therein.

4. A machine for processing materials, including a processing chamber, a rotatable member in said chamber for processing the material, means for altering the temperature of the material while being processed, and means actuated by the resistance of the material to said member by reason of the stiffness thereof for regulating the quantity of material introduced into said chamber so as to control the plasticity thereof.

5. A machine for processing materials, including a processing chamber, an agitating member therein, means for driving said member, a medium associated with said chamber for altering the temperature of the material while being agitated by said member, means for positively forcing the material to be processed through said chamber, and means for regulating the amount of material actuated by its resistance to said driving means to obtain the desired plasticity resulting from the action of said member and medium.

6. A machine for processing materials, including a processing chamber, an agitating member therein, means for driving said member, a medium for altering the temperature in said chamber, a pump for forcing material therein having a by-pass whereby excess material will be returned, a valve in said by-pass, torque actuated members controlled by the resistance of said material due to the plasticity thereof, and means connecting said torque actuated members with said valve whereby the quantity of material introduced in said chamber will be controlled.

7. A machine for processing materials, including a processing chamber, means for introducing material therein, an agitating member, a motor for driving said member, a torque connection between said motor and member actuated by the resistance to said member due to the plasticity of the material, and means actuated by said torque connection for controlling the quantity of material introduced into said chamber for maintaining the desired plasticity of the material being processed therein.

8. The method of processing materials consisting in passing the material to be processed through a processing chamber, altering the temperature thereof while agitating the same, and controlling the plasticity of the material through the resistance to agitation thereof due to its plasticity by introducing a greater or lesser quantity of material into said chamber.

9. A machine for processing materials, comprising a processing chamber, a unit for supplying a medium for altering the temperature of the material, and means actuated by the resistance of the material due to its plasticity for controlling said unit to maintain a uniform plasticity of said material.

10. A machine for processing materials, comprising a processing chamber, a unit for supplying a medium for altering the temperature of the material for affecting the plasticity thereof, and electric circuit for operating said unit, and an electric switch in said circuit controlled by the resistance of said material due to the plasticity thereof for effecting the operation of said unit to maintain a uniform plasticity of said material.

11. A machine for processing materials, comprising a processing chamber through which the material to be processed is adapted to be passed, a motor for driving an agitating member in said chamber, a unit for supplying a medium for altering the temperature of the material while being agitated, an electric circuit connecting with said unit for operating the same, an electric switch in said circuit, and means operatively connected with said switch and actuated by the resistance of the agitating member to the driving motor due to the plasticity of the material for making and breaking said circuit.

12. The method of processing materials consisting in passing the material to be processed through a temperature altering chamber while agitating the same, forcing a temperature altering medium around said chamber, and electrically controlling the forcing unit for said medium therein by a control switch actuated through the resistance of the material to the agitation thereof.

13. A machine for processing materials, including a processing chamber, means for introducing material therein, means for supplying a medium for altering the temperature thereof, an agitating member, a motor for driving said member, a torque connection between said motor and member actuated by the resistance to said member due to the plasticity of the material, means actuated by said torque connection, means for controlling the quantity of material introduced into said chamber for maintaining the desired plasticity of the material being processed therein, an electric circuit for controlling the medium supplying means and a switch in said circuit operated by said torque connection for controlling said circuit depending upon the resistance to said motor.

14. In combination with a chamber, a pump for forcing a plurality of fluids into said chamber at a predetermined ratio including separate intakes for said fluids, a common conduit communicating with said chamber into which said fluids are forced under pressure so as to co-mingle and be mixed together, means associated with each of said intakes for varying the amount of fluid passed through each, and common control mechanism for each of said last-mentioned means for simultaneously operating the same to maintain the ratio of said fluids substantially constant while varying their total quantity.

15. In combination with a chamber, a pump for forcing a plurality of fluids into said chamber at a predetermined ratio including separate intakes for said fluids, a common conduit communicating with said chamber into which said fluids are forced under pressure so as to co-mingle and be mixed together, and a valve controlled by-pass for one of said fluids for controlling the quantity of said fluid discharged into said common chamber.

16. In combination with a chamber, a pump for forcing a plurality of fluids into said chamber at a predetermined ratio including separate intakes for said fluids, a common conduit communicating with said chamber into which said fluids are forced under pressure so as to co-mingle and be mixed together, said pump comprising a pair of pistons for forcing the liquid into said common chamber, a cam adapted to operate both of said pistons, means for driving said cam, a relief valve for controlling the quantity of one of said fluids forced into said common chamber, and a valve controlled by-pass for controlling the quantity of the other fluid forced therein.

17. In combination with a chamber, means for forcing a plurality of fluids into said chamber at a predetermined ratio, a conduit communicating with said chamber into which said fluids are forced under pressure so as to co-mingle and be mixed together, a relief valve for controlling the quantity of one of said fluids forced into said chamber, a valve controlled by-pass for controlling the quantity of the other fluid forced therein, and an adjustable connection between said relief valve and by-pass valve for maintaining a predetermined constant ratio between said fluids.

18. A machine for processing materials comprising a processing chamber, means for forcing the material therein under pressure, means for processing material within said chamber, and means for variably controlling the discharge of the material from said chamber.

19. A machine for processing materials comprising a processing chamber, means for forcing the material therein under pressure, means for processing material within said chamber, means for resisting the discharge of the material from said chamber, and means for adjusting said resisting means for variably controlling the resistance to the discharge of said material.

20. A method of processing material including the passing of the same through a processing chamber, altering the plasticity of the material, agitating the material, and controlling the plasticity of the material by automatically varying the amount of material introduced responsive to variations in the resistance to agitation offered by the material.

21. A machine for processing materials comprising a processing chamber, a unit for supplying a medium for altering the plasticity of the material, and means actuated by the resistance of the material due to its plasticity for controlling said unit.

22. In combination with a chamber, means for forcing a plurality of fluids into said chamber at a predetermined ratio including a pump having separate intakes for each of said fluids, a conduit between said pump and said chamber into which said fluids are forced under pressure so as to co-mingle and be mixed together, a by-pass associated with each of said intakes for varying the amount of each fluid introduced, a valve in each of said by-passes, and a common control for said valves for simultaneously operating the same to maintain a substantially constant ratio between said fluids while varying the total quantity thereof.

23. In combination with a chamber, a pump for forcing a plurality of fluids into said chamber at a predetermined ratio including separate intakes for said fluids, a common conduit communicating with said chamber into which said fluids are forced under pressure so as to co-mingle and be mixed together, means associated with each of said intakes for varying the amount of fluid passed through each, common control mechanism for each of said last-mentioned means for simultaneously operating the same to maintain the ratio of said fluids substantially constant while varying their total quantity, and an adjustment for altering the constantly maintained ratio.

24. A machine for processing material, including a processing chamber, means in said chamber for agitating the material, a drive for said agitating means, means for supplying the material to the chamber, means for supplying temperature changing medium, and means movable in resistance to variations in the torque of said drive for controlling the supply of material, and also for controlling the supply of temperature changing medium.

25. The method of processing material, consisting in passing the material through a processing chamber, agitating the material in said chamber, delivering a temperature changing medium to alter the temperature of the material during the agitation, and controlling the plasticity of the material through the resistance to agitation thereof due to its plasticity by controlling the rate of delivery of the material to said chamber and also by controlling the supply of temperature changing medium.

In witness whereof, I have hereunto affixed my signature.

CLARENCE W. VOGT.

DISCLAIMER 1,783,867.—*Clarence W. Vogt*, Louisville, Ky. MACHINE FOR PROCESSING MATERIALS. Patent dated December 2, 1930. Disclaimer filed November 22, 1938, by the assignee, *The Girdler Corporation*.

Hereby enters its disclaimer of the subject matter of claims 18 and 19 of said Letters Patent, except where the means for variably controlling the discharge of the material in claim 18 is a yielding means, and except where the means for resisting the discharge of the material is a yielding means in claim 19.

[*Official Gazette December 13, 1938.*]